United States Patent Office 2,835,661
Patented May 20, 1958

2,835,661

METALLIZED THIAZOLEAZOHYDROXYAMINE COMPOUNDS

James M. Straley and John G. Fisher, Kingsport, Tenn., assignors to Eastman Kodak Company, Rochester, N. Y., a corporation of New Jersey No Drawing. Application April 19, 1956
Serial No. 579,169

8 Claims. (Cl. 260—146)

This invention relates to certain metallized azo dyes and their application to the dyeing or coloration of various materials.

The dyes of this invention are metallized complexes of azo dyes having the structural formula:

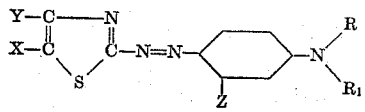

wherein R and $R_1$ represent the same or different radicals selected from the group consisting of hydrogen, alkyl, for example, methyl, ethyl, propyl, butyl, and the like, and hydroxyalkyl, for example, hydroxymethyl, hydroxyethyl, hydroxypropyl, and the like; X and Y represent the same or different radicals selected from the group consisting of hydrogen, haloalkyl, for example, trifluoromethyl, trichloromethyl, and the like, nitro, and alkyl, for example, methyl, ethyl, propyl, butyl, and the like; and Z represents hydroxyl or alkoxyl, for example, methoxyl, ethoxyl, propoxyl, and the like.

The nonmetallized dyes that are employed in preparing the dyes of this invention which have the above structural formula are prepared by diazotizing an aminothiazole having the structural formula:

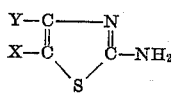

The resulting diazo compound is then reacted or coupled with an amine having the structural formula:

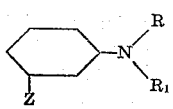

In the above formulas for the aminothiazole compound to be diazotized and the coupling compound, R, $R_1$, X, Y and Z are as defined in the formula set forth above for the metallized dyes. One method of carrying out the diazotization reaction involves dissolving the aminothiazole in a concentrated sulfuric acid solution and then adding sodium nitrite. The details of the diazotization reaction are set forth in the specific examples and the procedures described in those examples represent methods by which the diazotization reaction can be carried out.

The amines that are reacted with the aminothiazoles in preparing the dyes of this invention are termed couplers. Procedures that can be used in reacting the diazo compound with the amine coupler are set forth in detail in the specific examples hereinbelow.

The nonmetallized dyes, after their preparation, are reacted with a metal salt, such as suitable salts of nickel, cobalt, copper, chromium, manganese, iron or vanadium. The nonmetallized azo compounds can be metallized either on or off the materials they color. Metallization can be carried out, for example, by treating the non-metallized azo compound with a solution or dispersion of the metallizing agent. Although the metal complex is often formed at room temperature, we prefer to accelerate the process by heating, usually with steam, for a short period of time. The metallization is effected by procedures well known to those skilled in the art to which this invention is directed.

Illustrative of the metallizing agents that can be employed are the halides, the sulfates, the acetates, the cyanides and the thiocyanates of nickel, cobalt, chromium, manganese, iron and vanadium as well as various copper compounds. Thus, nickel chloride, nickel bromide, nickel sulfate, nickel acetate, nickel cyanide, nickel formate, nickel thiocyanate [$Ni(SCN)_2$], cobaltous bromide, cobaltic chloride, cobaltous chloride, cobaltous acetate, cobaltous cyanide, cobalt thiocyanate [$Co(SCN)_2$], cupric chloride, cupric bromide, cupric acetate, cupric lactate, chromium trichloride, chromium tribromide, chromic sulfate, chromic acetate, chromium thiocyanate [$Cr(SCN)_3$], manganese chloride, manganous sulfate, manganese acetate, manganese thiocyanate [$Mn(SCN)_2$], ferric chloride, ferric fluoride, ferrous acetate, ferrous thiocyanate [$Fe(SCN)_2$], ferric thiocyanate [$Fe(SCN)_3$], and vanadium thiocyanate [$V(SCN)_2$] are illustrative of the metallizing agents that can be employed.

The nonmetallized monoazo compounds described herein are useful for the dyeing of cellulose alkyl carboxylic acid esters having 2 to 4 carbon atoms in the acid groups thereof, nylon, sulfone polyesters, polyethylene terephthalate and polyacrylonitrile. After application to these materials, usually in the form of textile materials, the dye is metallized thereon. The metallized azo compounds of our invention can be applied by ordinary dyeing or printing techniques to nitrogenous textile materials such as wool, silk, nylon and acrylonitrile polymers, for example. Coloration can also be effected by incorporating the nonmetallized or metallized azo compounds into the spinning dope, spinning the fiber as usual and converting the nonmetallized azo compounds to their metallized form. Also the metallizing agent can be incorporated in the spinning dope, the fiber spun as usual and then dyed with the nonmetallized monoazo compounds to form the metal complex on the fiber. The new metallized dyes of our invention are preferably formed by heating the nonmetallized azo dye with the metallizing agent in organic solvents such as, for example, cellulose acetate, cellulose acetate-propionate, acrylonitrile polymers, polyamides, ethylene glycol monomethyl ether and formamide.

As is well known, one of the disadvantages dyed cellulose acetate texile fabrics suffer in comparison with some of the dyed competing textile fabrics, such as cotton, wool and viscose, for example, is lack of fastness to washing. Many schemes have been proposed to remedy this situation but all suffer from some significant fault. By means of our invention dyed cellulose acetate textile materials having good to excellent fastness to washing, light and gas are obtainable. These results may be obtained by dyeing the cellulose acetate textile material with the nonmetallized azo compounds and then treating the dyed cellulose acetate textile material with suitable metal salts which cause the original dye to form metallic complexes which are resistant, for example, to the action of washing, light and gas. These results can also be obtained by incorporating the metallized azo dye into the cellulose acetate spinning dope and spinning the fiber as usual. Thus, by means of the present invention, the disadvantage noted above with respect to the wash fastness of dyed cellulose acetate textile materials is either entirely or largely overcome. Cellulose acetate has been particularly referred to because it is the most widely used cellulose alkyl carboxylic acid ester.

When the metal complex is formed on a cellulose alkyl carboxylic acid ester, such as cellulose acetate, fiber the use of a metal thiocyanate appears to be advantageous and is preferred. Nickel thiocyanate appears to be especially useful and particular claim is laid to its use. Next to nickel thiocyanate the use of cobalt thiocyanate is preferred.

Metallization will be described in detail with reference to nickel and cobalt inasmuch as the metallized dyes containing these materials in complex combination appear to be advantageous. However, it will be clearly understood that the nonmetallized azo compounds can be metallized with the other metals disclosed herein. The azo compounds disclosed herein have varying utility as dyes. The degree of utility varies, for example, depending upon the material being colored and the actual dye employed.

The following examples will serve to illustrate our invention:

EXAMPLE 1
PREPARATION OF NON-METALLIZED DYE

A solution of 3.8 parts of sodium nitrite was added with stirring to 45 parts of concentrated $H_2SO_4$, the temperature rising to about 70° C. The solution was cooled to 0° C. and 50 parts of acetic-propionic acids (5:1) was added below 10° C. Five parts of 2-aminothiazole was added and a further 50 parts of acetic propionic acids (1:5) below 3° C. The mix was stirred 90 minutes at 0°–3° C. obtaining a clear, pale yellow solution. The diazo thus obtained was fun in below 10° C. to a solution of 8.3 parts of m-diethylaminophenol in 150 parts of acetic propionic acids (1:5) with good stirring. The mix was held at 10–12° C. for 1 hour after neutralizing the mineral acid to Congo with ammonium or sodium acetate. It was then poured into 2000 parts of cold water, filtered and the product dried at 60° C. in vacuo. There was thus obtained 10.2 parts of a material which dyes cellulose acetate, nylon, and polyacrylonitrile modified with 15% of N-methylmethacrylamide in orange to scarlet shades.

EXAMPLE 2

A 3% dyeing on cellulose acetate of the product of Example 1 wis dried and padded with a 2% solution of nickel thiocyanate in water under such conditions that the pickup was 60–100% of the weight of the goods. The piece was dried and steamed at 5 p. s. i. pressure for 10–20 minutes. The cloth was then scoured with soap and water at 60° C., rinsed and dried. The original color was changed to a deep violet. The dyeing which originally bled when subjected to a standard wash test at 120° F. withstands the standard wash test at 160° F. Further, while the original orange dyeing was fugative to light the metallized product showed no break after 20 fade-ometer hours.

EXAMPLE 3

The dyeing used in Example 2 was treated under identical conditions with a 2% solution of cobalt thiocyanate and the product was a deep blue dyeing of the same excellent resistance to the action of light and of soap and water.

Additional metallized dyes with the scope of this invention were prepared, and the results are shown in the following table.

Table

| Example | 2-Aminothiazole Used | Coupler | Metal Used | Color Original | Color Final |
|---|---|---|---|---|---|
| 4 | 4-Trifluoromethyl | m-Diethylaminophenol | Nickel | Orange | Pink. |
|   |                   |                      | Cobalt | do     | Do. |
| 5 | do | m-Aminophenol | Nickel | Yellow | Brown. |
|   |    |               | Cobalt | do     | Do. |
| 6 | 5-Nitro | m-Diethylaminophenol | Nickel | do | Violet. |
|   |         |                      | Cobalt | do | Do. |
| 7 | 4-Trifluoromethyl | m-Monoethylaminophenol | Nickel | Orange | Red. |
|   |                   |                        | Cobalt | do     | Do. |
| 8 | 4-Methyl | m-Di-$\beta$-hydroxyethylaminophenol | Nickel | do | Blue. |
|   |          |                                      | Cobalt | do | Do. |
| 9 | Unsubstituted | m-Di-hydroxyethylaminoanisole | Nickel | do | Rubine. |
|   |               |                               | Cobalt | do | Do. |
| 10 | 5-Nitro | N-Ethyl-N-$\beta$-hydroxyethyl-m-phenetidine | Nickel | Blue | Blue. |
|    |         |                                              | Cobalt | do   | Do. |
| 11 | 5-Methyl | m-Di-$\beta$-hydroxyethylaminoanisole | Nickel | Orange | Maroon. |
|    |          |                                       | Cobalt | do     | Do. |
| 12 | do | m-Hydroxyethylaminophenol | Nickel | do | Do. |
|    |    |                           | Cobalt | do | Do. |

We claim:
1. As a new composition of matter, a complex metal compound which contains a metal selected from the group consisting of chromium, cobalt, copper, iron, manganese, nickel and vanadium in complex combination with a monoazo compound having the structural formula:

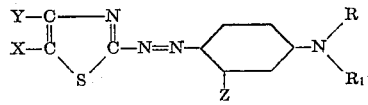

wherein R and $R_1$ are selected from the group consisting of hydrogen, alkyl and hydroxyalkyl, X and Y are selected from the group consisting of hydrogen, trifluoromethyl, trichloromethyl, nitro, and alkyl, and Z is hydroxyl, said alkyl and hydroxyalkyl radicals containing from 1 to 4 carbon atoms.

2. As a new composition of matter, a complex metal compound according to claim 1 wherein the metal is cobalt.

3. As a new composition of matter, a complex metal compound according to claim 1 wherein the metal is nickel.

4. As a new composition of matter, a nickel complex of the compound

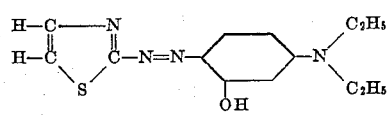

5. As a new composition of matter, a nickel complex of the compound

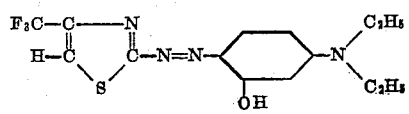

6. As a new composition of matter, a nickel complex of the compound
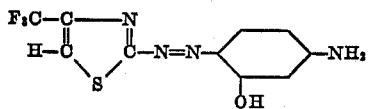
7. As a new composition of matter, a nickel complex of the compound
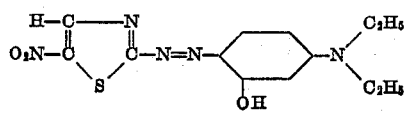
8. As a new composition of matter, a nickel complex of the compound
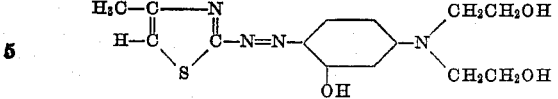
References Cited in the file of this patent
UNITED STATES PATENTS
| | | |
|---|---|---|
| 2,659,719 | Dickey et al. | Nov. 17, 1953 |
| 2,683,708 | Dickey et al. | July 13, 1954 |
| 2,726,237 | Towne et al. | Dec. 6, 1955 |
FOREIGN PATENTS
| | | |
|---|---|---|
| 719,363 | Great Britain | Dec. 1, 1954 |